United States Patent
Lee

(10) Patent No.: US 7,862,852 B2
(45) Date of Patent: Jan. 4, 2011

(54) MANUFACTURING METHOD OF TANTALUM CONDENSER

(75) Inventor: Gi Ahn Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 282 days.

(21) Appl. No.: 12/007,415

(22) Filed: Jan. 10, 2008

(65) Prior Publication Data

US 2008/0233275 A1    Sep. 25, 2008

(30) Foreign Application Priority Data

Mar. 19, 2007    (KR) .................. 10-2007-0026572

(51) Int. Cl.
C25D 11/02 (2006.01)
C25D 11/04 (2006.01)
C25D 11/06 (2006.01)

(52) U.S. Cl. .................. 427/79; 427/419.2; 427/419.5; 427/331; 427/333; 205/170; 205/171; 205/172

(58) Field of Classification Search .......... 427/212, 427/220, 221, 419.2, 419.5, 532; 205/171, 205/175
See application file for complete search history.

(56) References Cited

U.S. PATENT DOCUMENTS

| 6,001,281 A | * | 12/1999 | Lessner et al. ............ 252/500 |
| 6,554,884 B1 | * | 4/2003 | Tripp et al. .................. 75/252 |
| 2008/0233274 A1 | * | 9/2008 | Lee ............................. 427/79 |

FOREIGN PATENT DOCUMENTS

| JP | 2006-108658 | | 4/2006 |
| KR | 2000-0002983 A | | 1/2000 |
| WO | WO 2006/030922 | * | 3/2006 |
| WO | WO 2006030922 | * | 3/2006 |

OTHER PUBLICATIONS

Holman, Sound for Film and Television, Focal Press, (2002).*
Tadros, Applied Surfactants: Principles and Applications, Wiley-VCH, (2005).*
Merker et al."New Conducting Polymer Dispersions for Solid Electrolyte Capacitors", Conference Papers: ARTS Europe 2005 Symposium, (2005).*
Chinese Office Action, with English Translation, issued in Chinese Patent Application No. 200810004151.9, mailed Aug. 5, 2010.

* cited by examiner

Primary Examiner—Michael Cleveland
Assistant Examiner—Lisha Jiang
(74) Attorney, Agent, or Firm—McDermott Will & Emery LLP

(57) ABSTRACT

There is provided a method of manufacturing a tantalum condenser, in which a high-performing tantalum condenser is manufactured through a more simplified and higher-efficient process using simpler and economical equipment. The method of manufacturing a tantalum condenser including: preparing a tantalum pellet by sintering a tantalum powder; oxidizing the tantalum pellet to form a dielectric layer on a surface thereof; forming a polymer layer on the tantalum pellet having the dielectric layer formed on the surface thereof; and immersing the tantalum pellet having the polymer layer formed on the surface thereof in a polymer suspension to be subjected to chemical reformation.

12 Claims, 4 Drawing Sheets

MANUFACTURING METHOD OF TANTALUM CONDENSER

CROSS-REFERENCE TO RELATED APPLICATIONS

This application claims the priority of Korean Patent Application No. 2007-26572 filed on Mar. 19, 2007, in the Korean Intellectual Property Office, the disclosure of which is incorporated herein by reference.

BACKGROUND OF THE INVENTION

1. Field of the Invention

The present invention relates to a method of manufacturing a tantalum condenser, and more particularly, to a method of manufacturing a tantalum condenser, in which a high-performing tantalum condenser is manufactured through a more simplified and higher-efficient process using simpler and economical equipment.

2. Description of the Related Art

A tantalum condenser utilizes tantalum Ta as an electrode. That is, tantalum is a conductor but turned into a high-quality insulator when oxidized. When it comes to a tantalum condenser, the tantalum is oxidized as an anode into dielectrics and then an additional cathode is formed. The tantalum condenser is obtained by utilizing pores generated when tantalum powder is sintered and hardened.

There are two types of tantalum condensers. One is a wet tantalum condenser which employs an electrolyte solution and has a silver Ag case formed at a cathode to prevent the electrolyte solution from leaking. The other one is a dry tantalum condenser which uses a solid such as manganese dioxide as an electrolyte without adopting the electrolyte solution.

FIG. 1 is a flow chart illustrating a conventional method of manufacturing a tantalum condenser. To manufacture the tantalum condenser, first, a tantalum powder is sintered to form a pellet as in operation S10. Then, the tantalum pellet formed is oxidized and chemically reformed to have an oxide formed on a surface thereof as in operation S12.

When the oxide, i.e., dielectric layer is formed on the surface of the tantalum pellet, a cathode layer is formed. A polymer layer is formed as the cathode layer in operation S14. Generally, the polymer layer is immersed in a solution containing monomors and the monomers are polymerized on the surface of the tantalum pellet, i.e., in pores. After the polymer layer is formed, the tantalum pellet is chemically reformed to cover defects of the dielectric layer in operation S16. To be chemically reformed, the tantalum pellet is immersed in a chemical reformation solution while a voltage is applied.

With the chemical reformation completed, the tantalum pellet is cleaned to remove the residual chemical reformation solution which may act as impurities to adversely affect the product in operation S18. After the cleaning, it is checked whether the cathode layer has been fully formed in operation S19. In a case where the polymer layer, i.e., cathode layer is not completely formed as in S19: N, the polymer layer is formed again on the tantalum pellet as in operation S14, and then tantalum pellet is chemically reformed and cleaned as in operations S16 and S18. With the cathode layer completely formed in operation S19: Y, the tantalum condenser is manufactured FIG. 2 illustrates a tantalum pellet immersed in a chemical reformation solution in manufacturing a tantalum condenser according to a conventional method. The tantalum pellet 20 is immersed in a chemical reformation bath 23 while being connected to a metal plate 21. The tantalum pellet 20 has a dielectric layer and a polymer layer formed on a surface thereof. The chemical reformation solution 22 may utilize an acidic solution, for example, an acidic aqueous solution such as phosphoric acid, sulfuric acid, nitric acid, acetic acid, ammonium nitrate, and sodium nitrate. Alternatively, the chemical reformation solution 22 may adopt an aqueous solution containing a dopant such as p-TSA.

Chemical reformation is performed by connecting power 24 to the tantalum pellet 20 and the chemical reformation solution 22 and applying voltages. Here, a positive (+) voltage is applied to the tantalum pellet 20 which is an anode and a negative (−) voltage is applied to the chemical reformation solution 22.

This chemical reformation necessarily should be followed by a cleaning process for removing the residual chemical reformation solution. In a case where the chemical reformation solution is p-toluene sulfonic acid (p-TSA), the tantalum pellet needs to be cleaned with water to remove the p-TSA. An electrolyte of this chemical reformation solution and a cleaning material remaining in the polymer layer, i.e. cathode layer causes current to leak from the cathode layer, thereby adversely affecting performance of the condenser.

The cleaning after chemical reformation is typically carried out in a solution having a high temperature of 50 to 80° C. At this time, the cleaning after chemical reformation may be performed even though the polymer layer is formed outside the tantalum pellet. This however causes the polymer layer to be detached from the pellet or generates cracks on the polymer layer itself. Also, such cleaning after chemical reformation requires additional cleaning and drying equipment.

That is, after chemical reformation, the chemical reformation solution should be cleaned by way of at least one cleaning and drying process. Consequently, the chemical reformation and the cleaning thereafter trigger unnecessary stress and destabilize an overall system, thereby degrading process efficiency and posing a difficulty to quality management.

Therefore, there have been continued demands for a method of manufacturing a tantalum condenser in a more simplified and economical fashion while maintaining or increasing performance of the tantalum condenser.

SUMMARY OF THE INVENTION

An aspect of the present invention provides a method of manufacturing a high-performing tantalum condenser, in which a high-performing tantalum condenser is manufactured through a more simplified and higher-efficient process using simpler and economical equipment.

According to an aspect of the present invention, there is provided a method of manufacturing a tantalum condenser, the method including: preparing a tantalum pellet by sintering a tantalum powder; oxidizing the tantalum pellet to form a dielectric layer on a surface thereof; forming a polymer layer on the tantalum pellet having the dielectric layer formed on the surface thereof; and immersing the tantalum pellet having the polymer layer formed on the surface thereof in a polymer suspension to be subjected to chemical reformation. The polymer suspension may have nano-scale polymers suspended therein.

The forming a polymer layer may include immersing the tantalum pellet in a solution containing a monomer and an oxidant such that polymer polymerization is performed on the tantalum pellet. The monomer may include one selected from a group consisting of a thiophene monomer, an imide monomer, a pyrrole monomer, an aniline monomer, and a furan monomer. The oxidant may include one of ferric chloride and ammonium persulfate.

The forming a polymer layer may include: depositing a polymer on the tantalum pellet having the dielectric layer formed on the surface thereof by immersing the tantalum pellet in the polymer suspension; and drying the tantalum pellet having the polymers deposited thereon. The polymer suspension may have nano-scale polymers suspended therein.

The drying the tantalum pellet may be performed at a temperature of 25° C. to 260° C. The depositing a polymer and the drying the tantalum pellet may be repeated until the polymer is completely deposited. The depositing a polymer and the drying the tantalum pellet may be repeated four times or more.

The polymer suspension may be a conductive polymer suspension. The conductive polymer may be formed of one selected from a group consisting of polythiophene, polyimide, polypyrrole, polyanailine, and polyfuran. The conductive suspension may include a conductive polymer and a dispersant.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
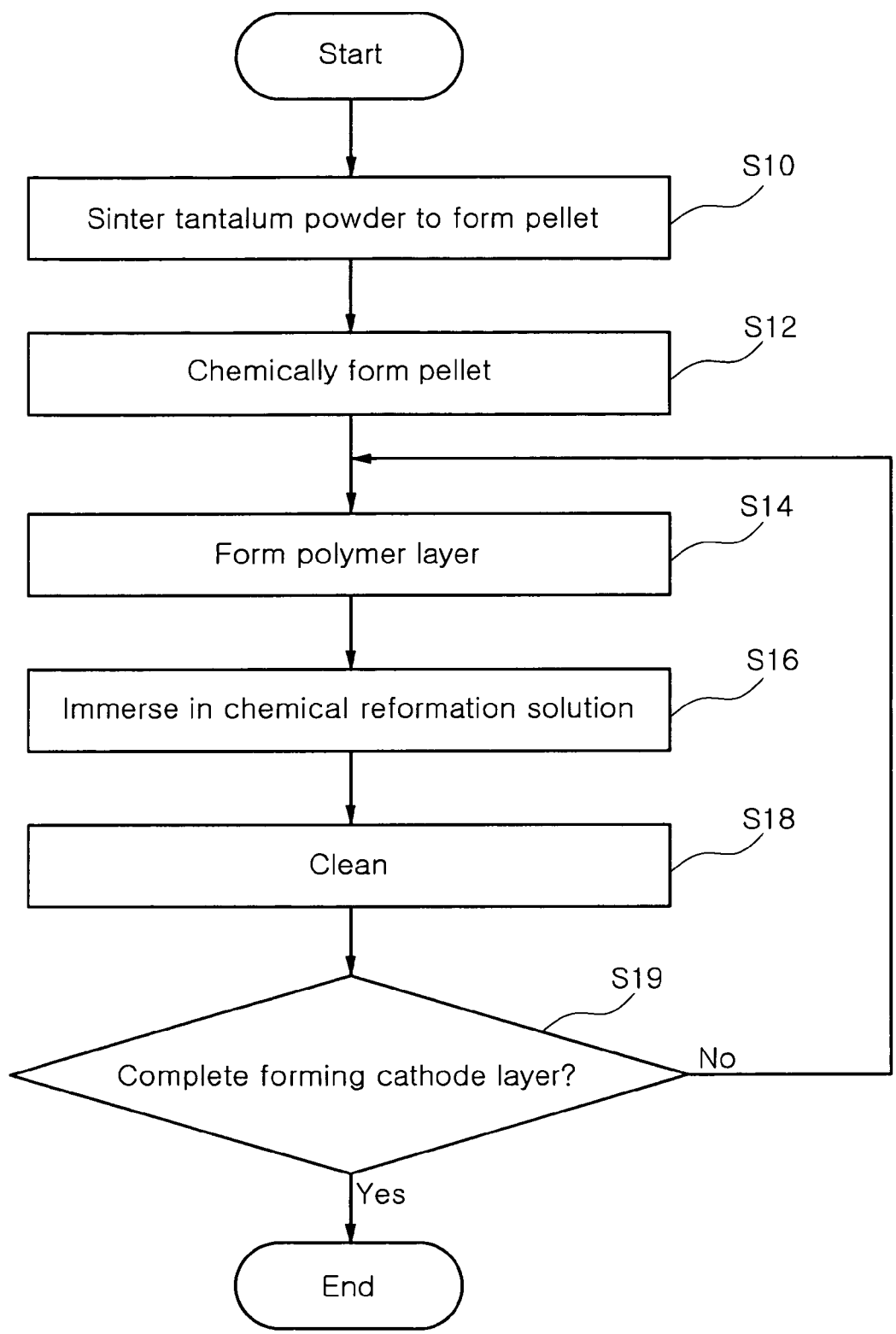
FIG. 1 is a flow chart illustrating a conventional method of manufacturing a tantalum condenser.
Figure 2:
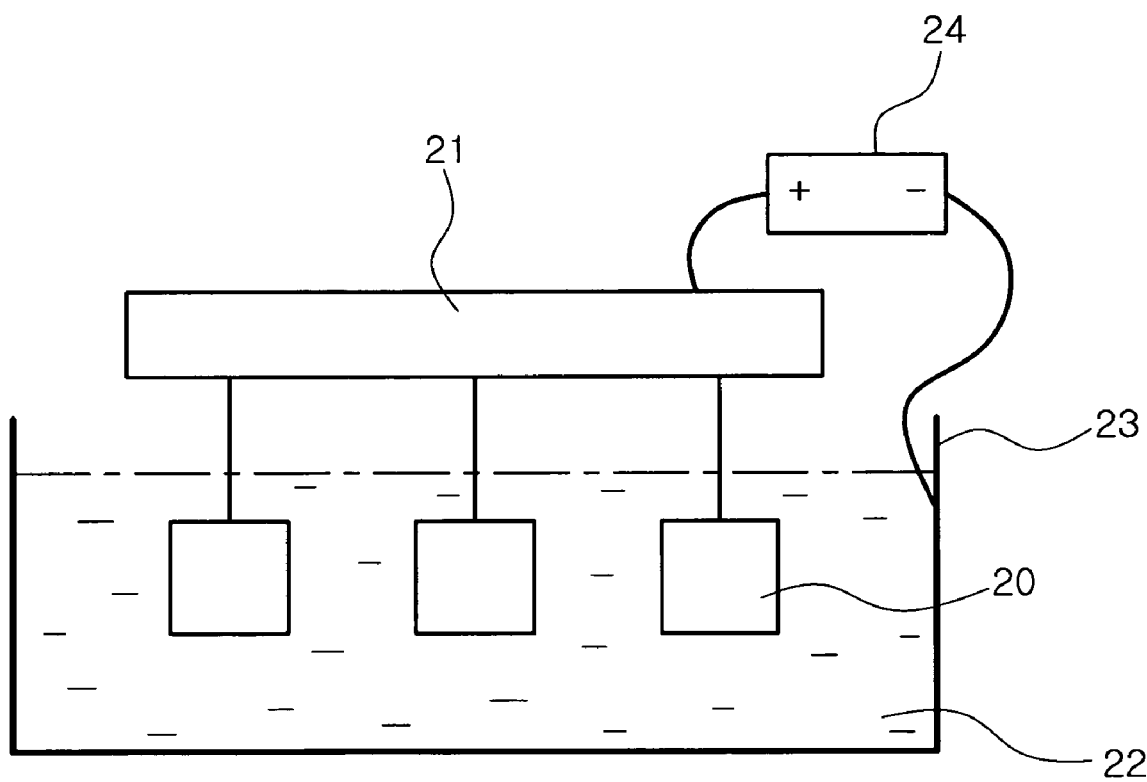
FIG. 2 is a view illustrating a tantalum pellet immersed in a chemical reformation solution in manufacturing a tantalum condenser according to a conventional method.
Figure 3:
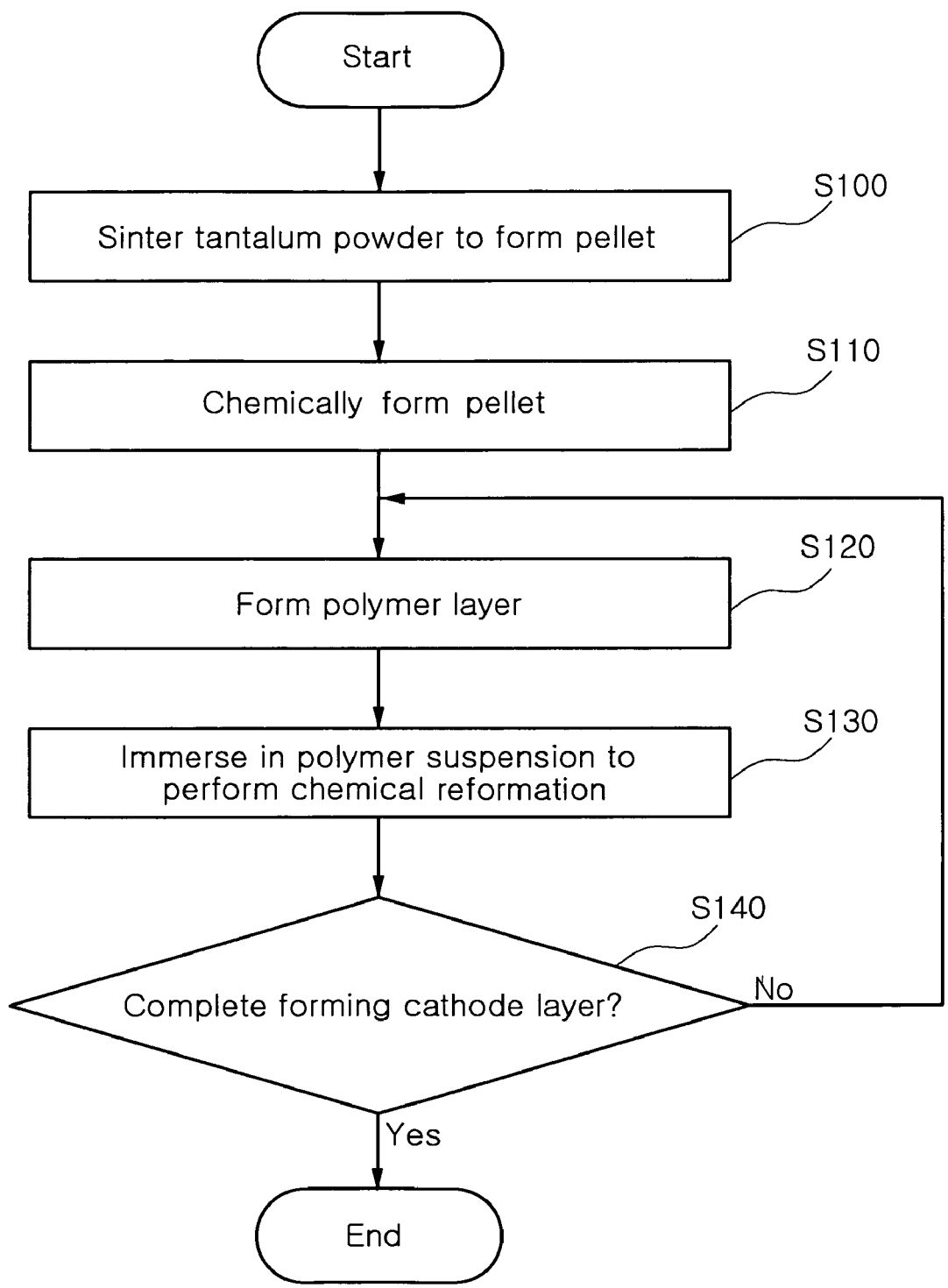
FIG. 3 is a flow chart illustrating a method of manufacturing a tantalum condenser according to an exemplary embodiment of the invention.

FIG. 3 is a flow chart illustrating a method of manufacturing a tantalum condenser according to an exemplary embodiment of the invention.

In the manufacturing method of the tantalum condenser, a tantalum powder is sintered to prepare a tantalum pellet. The tantalum pellet is oxidized to form a dielectric layer on a surface thereof. A polymer layer is formed on the tantalum pellet having a dielectric layer formed on the surface thereof. The tantalum pellet having the polymer layer formed thereon is immersed in a polymer suspension to be chemically reformed.

To manufacture the tantalum condenser, first, the tantalum powder is sintered to produce the tantalum pellet and the tantalum pellet is oxidized in operation S100. The tantalum powder is mixed with a binder or solvent before being sintered to enhance binding force and fluidity of particles. The tantalum powder mixed with the binder is compacted into a pellet with a desired size. Such compacting may be performed by a press method using a mold. For example, the tantalum pellet may be sintered within a sintering furnace in a high vacuum and at a high temperature. For example, the tantalum pellet may be sintered at a pressure of $1.0 \times 10^{-7}$ Torr and at a temperature of 1300° C. to 2000° C.

The tantalum pellet obtained is oxidized through chemical formation in operation S110. A tantalum oxide $Ta_2O_5$ is formed on the surface of the tantalum pellet and pores generated by sintering. The tantalum oxide serves as a dielectric layer.

A tantalum line may be extended from the tantalum pellet to facilitate processes such as chemical formation or cathode layer formation before the tantalum powder is sintered. Therefore, for the chemical formation, the tantalum line extended from the tantalum pellet is bonded to a metal plate. Then, voltages are applied to a metal plate and a chemical formation solution, respectively to form an oxide on the surface of the tantalum pellet. The tantalum oxide formed functions as a dielectric layer in the tantalum condenser.

When the tantalum pellet is prepared and the tantalum oxide is formed, the polymer layer is formed on the surface of the tantalum pellet in operation S120.

Here, to form the polymer layer, the tantalum pellet is immersed in a solution containing monomers and an oxidant such that polymer polymerization is performed on the tantalum pellet. Here, the monomers may be selected from a group consisting of thiophene monomers, imide monomers, pyrrole monomers, aniline monomers, and furan monomers.

The oxidant is an electron donor donating electrons to the polymer, thereby imparting desired conductivity to the polymerized polymer. The oxidant may adopt e.g., ferric chloride or ammonium persulfate.

Alternatively, in forming the polymer layer, the tantalum pellet may be immersed in a polymer suspension in place of utilizing the solution containing the monomer and the oxidant. Polymer particles from the polymer suspension are deposited on the tantalum pellet having the dielectric layer formed on the surface thereof, thereby forming the polymer layer. Polymers are previously polymerized and dispersed in the polymer suspension with a size such that the polymers can be deposited into the tantalum pellet. The depositable size means a size enabling the polymers to be infiltrated into the tantalum pellet having minute pores with less than 10 μm. For example, the depositable size means a nanoscale.

The polymers may be a conductive polymer. The conductive polymer means a polymer having a conductivity of at least $10^{-7}$ S/cm, i.e., a value greater than or equal to a conductivity of a semiconductor. Typically, a conductive polymer can have a high conductivity by doping electron receptors or electron donors in the polymers.

The polymer layer is formed to function as a cathode layer of the tantalum condenser, and thus should have a predetermined conductivity. The conductive polymer may adopt any conductive polymers that can be utilized as a cathode. For example, the conductive polymers may utilize one of polythiophene, polyimide, polypyrrole, polyanailine, and polyfuran. The conductive polymers may be polymerized into a predetermined depositable size in the tantalum pellet by adjusting a molecular weight thereof.

Also, the polymer suspension may include a dispersant, i.e., a supplemental agent capable of dispersing the conductive polymers to be present as small particles such as colloidal polymers in the suspension. The dispersant is added to prevent agglomeration of fine particles generated when pulverizing big particles and agglomerated particles into smaller particles and colloidal particles. A dispersant typically utilizes an adsorptive material such as a surfactant.

After the polymer layer is formed, the tantalum pellet is dried to leave only a solid content out of the polymer suspension. The drying is performed at a predetermined temperature considering characteristics of the polymer suspension, i.e., characteristics of the conductive polymer and dispersant. For example, the drying may be performed at a temperature of 25° C. to 260° C. The tantalum pellet may be immersed back in the polymer suspension and dried repeatedly until the polymers are completely deposited. The repeated number of times may be four or more. The immersing and drying repeated less than four times do not ensure the cathode layer to be formed sufficiently, thereby ill-affecting performance of the tantalum condenser.

When the polymer layer is formed in operation S120, the tantalum pellet is chemically reformed to cover defects which may occur on the dielectric layer during the formation of polymer layer in operation S130. In the manufacturing method of the tantalum condenser, the polymer suspension is employed as a chemical reformation solution. The polymer suspension 220 can be identical to the polymer suspension which may be used in forming the polymer layer. Alternatively, the polymer suspension 220 can be different from that used in forming the polymer layer. The polymer suspension identical to that used in forming the cathode layer, i.e., polymer layer assures a more effective process. Polymer particles present in the polymer suspension 220 serve to cover a damaged portion of the dielectric layer, or resultant detachment or cracks of the polymer layer.

The polymer present in the polymer suspension 220 as the chemical reformation solution 220 may be a conductive polymer. The conductive polymer applicable to the polymer suspension 220 may be one of polythiophene, polyimide, polypyrrole, polyanailine, and polyfuran. The conductive polymer may be present in the polymer suspension 220 in an appropriate size capable of covering impairment, detachment or cracks of the dielectric layer or the polymer layer. Accordingly, to ensure the conductive polymer of a predetermined size to exist in the polymer suspension, the polymer suspension 220 may contain a dispersant, e.g., a surfactant.

After the chemical reformation, it is checked whether the cathode layer has been completely formed in operation S140. In a case where the cathode layer, i.e., polymer layer has not been completely formed as in operation S140: N, the tantalum pellet is immersed back in the polymer suspension in operation S120, and then the polymer layer is formed and chemically reformed in operations S120 and S130.

Completion of the cathode layer S140: Y is followed by processes such as having the cathode layer contact a lead frame for connection with an external power, forming an electrode line for leading out an electrode and sealing with a resin thereby to manufacture the tantalum condenser.

Figure 4:
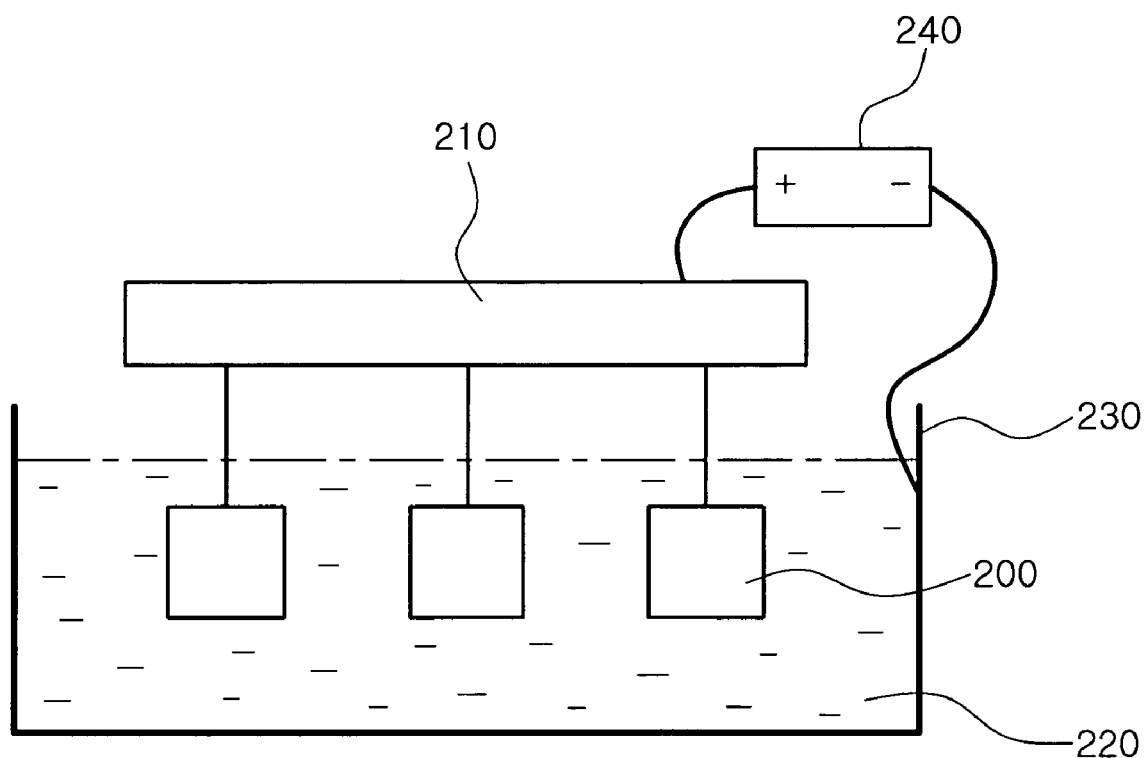
FIG. 4 is a view illustrating a tantalum pellet immersed in a polymer suspension in manufacturing a tantalum condenser according to an exemplary embodiment of the invention.

FIG. 4 illustrates a tantalum pellet immersed in the polymer suspension in manufacturing the tantalum condenser according to an exemplary embodiment of the present invention. The tantalum pellet 200 is connected to a metal plate 210 and the metal plate 210 supports the tantalum pellet 200 to keep immersed in the polymer suspension 220, i.e., chemical reformation solution.

The tantalum pellet 200 is surrounded by the polymer suspension 220, i.e., chemical reformation solution in a chemical reformation bath 230. Accordingly, conductive polymer particles dispersed in the polymer suspension 220 are deposited into the tantalum pellet 200.

After the conductive polymer particles are deposited on a surface of the tantalum pellet 200, power 240 is connected to the tantalum pellet 200 and the chemical reformation solution 200 and voltages are applied. A plus + voltage is applied to the tantalum pellet 200 which is an anode, and a minus − voltage is applied to the chemical reformation solution 220. Here, the voltage for the chemical reformation is 50 to 90% of the voltage applied for chemical formation, and a specific resistance of 5000 Ω-Cm to 20000 Ω-Cm is maintained during the process.

After a predetermined time passes, the tantalum pellet 200 is taken out from the chemical reformation bath 230. When it is determined that defects of the polymer layer, i.e., cathode layer have not been fully covered, the pellet is immersed back in the chemical reformation bath 230 to be subjected to the chemical reformation.

According to the present embodiment, chemical reformation is performed using the polymer suspension 220 having polymers dispersed in a nano scale. This precludes a need for a conventional cleaning process for removing impurities used as a solvent of the chemical reformation solution after chemical reformation. That is, the polymer particles present in the polymer suspension 220 having the polymers dispersed in a nano scale serve to apply the voltage to a damaged portion of the dielectric layer and the polymer layer on the surface of the tantalum pellet 200. Thus, the polymer particles remaining in the product does not act as impurities but enhance product capacity. That is, the chemical reformation of the present embodiment obviates a need for a cleaning process necessary for conventional chemical reformation. Moreover, in the chemical reformation of the present embodiment, there are no impurities left and residuals serve to increase characteristics of the product.

Embodiment

A tantalum condenser of Inventive Example 1 was manufactured by utilizing a polymer suspension in a chemical reformation process according to a manufacturing method of an exemplary embodiment of the invention. Also, a tantalum condenser of Comparative Example 1 was manufactured using phosphoric acid, a conventional chemical reformation solution in a chemical reformation process and a tantalum condenser of Comparative Example 2 was manufactured using p-TSA.

As shown in Table 1, Inventive Example 1, and Comparative Examples 1 and 2 were measured in performance of tantalum condensers at 25V, and 15μF, specifically, capacitance C, damping factor DF, equivalent series resistance ESR, and LC defect.

TABLE 1

|  | C (μF) | DF (%) | ESR (mΩ) | LC |
|---|---|---|---|---|
| Inventive Example 1 | 14.4 | 0.9 | 38 | 0.23 |
| Comparative Example 1 | 14.5 | 1.2 | 39 | 0.72 |
| Comparative Example 2 | 14.6 | 1.2 | 37 | 1.03 |

As can be seen in Table 1, the tantalum condenser of Inventive Example 1 in which the chemical reformation is performed using the polymer suspension exhibits substantially similar performance to the tantalum condensers of Comparative Examples 1 and 2 which adopt the phosphoric acid, i.e., the conventional chemical reformation solution. Therefore it has been found that the tantalum condenser can be manufactured in a more simplified and higher-efficient process while maintaining similar performance according to the present invention.

The embodiments of the present invention are only exemplary but do not limit the present invention. Embodiments with substantially identical construction and operational effects to technical features of the claims of the present invention shall fall within the technical scope of the present invention.

As set forth above, according to exemplary embodiments of the invention, a method of manufacturing a tantalum condenser precludes a need for cleaning equipment for chemical reformation, thereby ensuring the process to be performed with simpler and economical equipment.

Also, in the manufacturing method, there is no need for a conventional cleaning process for removing impurities used as a solvent of chemical reformation solution. Polymer particles present in a polymer suspension having polymers dispersed in a nano scale serve to apply the voltage. Thus, the polymer particles remaining in the product do not act as impurities but enhance product capacity. That is, the manufacturing method obviates a need for a cleaning process necessary for conventional chemical reformation, and renders the product free from impurities, while residuals contribute to better characteristics of the product. This allows the tantalum condenser to be manufactured in a more simplified and higher-efficient process. This as a result produces a higher-performing tantalum condenser more economically.

In addition, high-temperature cleaning and drying after chemical reformation with the polymer layer formed outside the pellet cause the polymer layer to be detached from the pellet or crack the polymer layer itself. However, the chemical reformation of the present invention involves only a drying process, thereby overcoming problems of detachment and cracks which undermine reliability.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a tantalum condenser, the method comprising:
    preparing a tantalum pellet by sintering a tantalum powder;
    oxidizing the tantalum pellet to form a dielectric layer on a surface thereof;
    forming a polymer layer on the tantalum pellet having the dielectric layer formed on the surface thereof by immersing the tantalum pellet in a polymer suspension; and
    immersing the tantalum pellet having the polymer layer formed on the surface thereof in a polymer suspension to be subjected to chemical reformation,
    wherein the polymer suspension employed in chemical reformation is identical to the polymer suspension used in forming the polymer layer.

2. The method of claim 1, wherein the polymer suspension has nano-scale polymers suspended therein.

3. The method of claim 1, wherein the forming a polymer layer additionally comprises immersing the tantalum pellet in a solution containing a monomer and an oxidant such that polymer polymerization is performed on the tantalum pellet to form another polymer layer after forming the polymer layer by using the polymer suspension.

4. The method of claim 3, wherein the monomer comprises one selected from a group consisting of a thiophene monomer, an imide monomer, a pyrrole monomer, an aniline monomer, and a furan monomer.

5. The method of claim 3, wherein the oxidant comprises one of ferric chloride and ammonium persulfate.

6. The method of claim 1, wherein the forming a polymer layer comprises:
    depositing a polymer on the tantalum pellet having the dielectric layer formed on the surface thereof by immersing the tantalum pellet in the polymer suspension; and
    drying the tantalum pellet having the polymers deposited thereon.

7. The method of claim 6, wherein the drying the tantalum pellet is performed at a temperature of 25° C. to 260° C.

8. The method of claim 6, wherein the depositing a polymer and the drying the tantalum pellet are repeated until the polymer is completely deposited.

9. The method of claim 8, wherein the depositing a polymer and the drying the tantalum pellet are repeated four times or more.

10. The method of claim 1, wherein the polymer suspension is a conductive polymer suspension.

11. The method of claim 10, wherein the conductive polymer comprises one selected from a group consisting of polythiophene, polyimide, polypyrrole, polyaniline, and polyfuran.

12. The method of claim 1, wherein the conductive suspension comprises a conductive polymer and a dispersant.

* * * * *